United States Patent
Lee (10) Patent No.: US 8,856,208 B2
(45) Date of Patent: Oct. 7, 2014

(54) METHOD AND APPARATUS FOR FORMING IMAGE

(75) Inventor: Jae-in Lee, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 51 days.

(21) Appl. No.: 12/173,953

(22) Filed: Jul. 16, 2008

(65) Prior Publication Data

US 2009/0067757 A1 Mar. 12, 2009

(30) Foreign Application Priority Data

Sep. 11, 2007 (KR) .................................. 2007-92293

(51) Int. Cl.
G06F 15/16 (2006.01)
G03B 27/72 (2006.01)
H04N 1/00 (2006.01)

(52) U.S. Cl.
CPC ............ *G03B 27/72* (2013.01); *H04N 1/00183* (2013.01); *H04N 1/00132* (2013.01); *H04N 1/00175* (2013.01); *H04N 1/00169* (2013.01); *Y10S 379/90* (2013.01)
USPC ............................ 709/203; 379/900; 345/427

(58) Field of Classification Search
CPC .......... H04N 1/00132; H04N 1/00169; H04N 1/00175; H04N 1/00183
USPC ......................................................... 709/203
See application file for complete search history.

(56) References Cited

U.S. PATENT DOCUMENTS

| 6,184,860 | B1 * | 2/2001 | Yamakawa ..................... 715/823 |
| 6,304,277 | B1 * | 10/2001 | Hoekstra et al. .............. 345/600 |
| 6,522,418 | B2 * | 2/2003 | Yokomizo et al. ........... 358/1.15 |
| 7,287,088 | B1 * | 10/2007 | Anderson ..................... 709/235 |

(Continued)

FOREIGN PATENT DOCUMENTS

KR 10-2006-0111116 10/2006

OTHER PUBLICATIONS

Korean Office Action issued Feburary 7, 2012 in corresponding Korean Patent Application 10-2007-0092293.

*Primary Examiner* — Arvin Eskandarnia
(74) *Attorney, Agent, or Firm* — Staas & Halsey LLP (57) ABSTRACT

A method of forming an image includes displaying a list of one or more editing items to be used in editing the image; selecting at least one editing item from the displayed list; and converting the image t using the at least one selected editing item and processing the image. An apparatus for forming an image includes a display unit that displays a list of one or more editing items to be used in editing the image; an input panel unit that receives a selection of at least one editing item from the displayed list of editing items; and a control unit that converts the image using the at least one selected editing item. The editing items may be stored in the apparatus for forming an image or may be registered to a server. Therefore, the editing items having an image editing function can be shared between users and thus an image desired by a user can be easily and conveniently obtained.

21 Claims, 7 Drawing Sheets

(56) References Cited

U.S. PATENT DOCUMENTS

| | | | |
|---|---|---|---|
| 2002/0007391 A1* | 1/2002 | Suzuki | 709/203 |
| 2002/0073121 A1* | 6/2002 | Sano et al. | 707/517 |
| 2005/0152004 A1* | 7/2005 | Park | 358/1.18 |
| 2005/0174349 A1* | 8/2005 | Watson | 345/427 |
| 2006/0072166 A1* | 4/2006 | Fuchs et al. | 358/452 |
| 2006/0080607 A1* | 4/2006 | Cohen et al. | 715/705 |
| 2007/0030506 A1* | 2/2007 | Takabayashi et al. | 358/1.9 |
| 2007/0046698 A1* | 3/2007 | Nam et al. | 345/660 |
| 2007/0121141 A1* | 5/2007 | Takabayashi et al. | 358/1.9 |
| 2007/0146800 A1* | 6/2007 | Jeong | 358/302 |
| 2007/0260979 A1* | 11/2007 | Hertzfeld et al. | 715/530 |

* cited by examiner

Water_Reflection.ATN
 – Make snapshot
   From : Current History State
   Using : full document
 – Convert Mode
 – Duplicate current layer
 – Transform current layer
 – Ripple
 – Motion Blur
 – Hue/Saturation
   Hue: 0
   Saturation: -20
   Lightness: 0
 – Set current layer

FIG. 2B

Sepia_Toning.ATN
 – Make snapshot
   From : Current History State
   Using : full document
 – Make layer
 – Merge visible
 – Make
   New: adjustment layer with Group
   Type: hue/saturation with Colorize
   Adjustment : hue/saturation adjustment list
   Hue:30
   Saturation:25
   Lightness: 0

METHOD AND APPARATUS FOR FORMING IMAGE

CROSS-REFERENCE TO RELATED APPLICATIONS

This application claims the benefit of Korean Application No. 2007-92293, filed Sep. 11, 2007, in the Korean Intellectual Property Office, the disclosure of which is incorporated herein by reference.

BACKGROUND OF THE INVENTION

1. Field of the Invention

Aspects of the present invention relate to a method and apparatus for forming an image, and more particularly, to a method and apparatus for forming an image by converting an image including a photograph or the like.

2. Description of the Related Art

As digital cameras are widely used, the demand for photo printers and multi-function printers that print out photographs captured by digital cameras has increased. In addition, in order to obtain more desirable images, users like to apply special effects to their photographs or perform image editing such as refocusing or brightness adjusting, instead of printing out the photographs as they are. Users have been able to edit images photographed by a digital camera by using simple image editing functions such as a refocusing function or a brightness adjusting function supported by a photo printer or a multi-function printer. However, in order to edit more complex images, a user has to download the photographs to their PC and perform image editing by using applications such as PHOTOSHOP (Adobe Systems Inc., San Jose, Calif.) operated by the PC. In this case, the user needs to own a copy of the application such as PHOTOSHOP and needs be fully capable of using the application. In order to obtain a desired edited image, timely and complex processes are required.

SUMMARY OF THE INVENTION

Aspects of the present invention provide a method and apparatus for forming an image by sharing items having image editing functions between users so as to easily convert an image from an original image by using such items in order to obtain desired images easily and conveniently.

According to an embodiment of the present invention, there is provided a method of forming an image using editing items, the method including: displaying a list of one or more editing items to be used in editing the image; selecting at least one editing item from the displayed list; converting the image using the at least one selected editing item and processing the converted image.

According to an embodiment of the present invention, there is provided a method of forming an image using editing items, the method including: displaying a list of one or more editing items to be used in editing the image; receiving a selection of at least one editing item from the displayed list; converting the image using the at least one selected editing item and processing the converted image.

According to another embodiment of the present invention, there is provided a computer readable recording medium having embodied thereon a computer program for executing the method above.

According to another embodiment of the present invention, there is provided an apparatus for forming an image by using editing items, the apparatus including: a display unit that displays a list of one or more editing items to be used in editing the image; an input panel unit that receives a selection of at least one item from the displayed list of editing items; and a control unit that converts the image using the at least one selected editing item.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
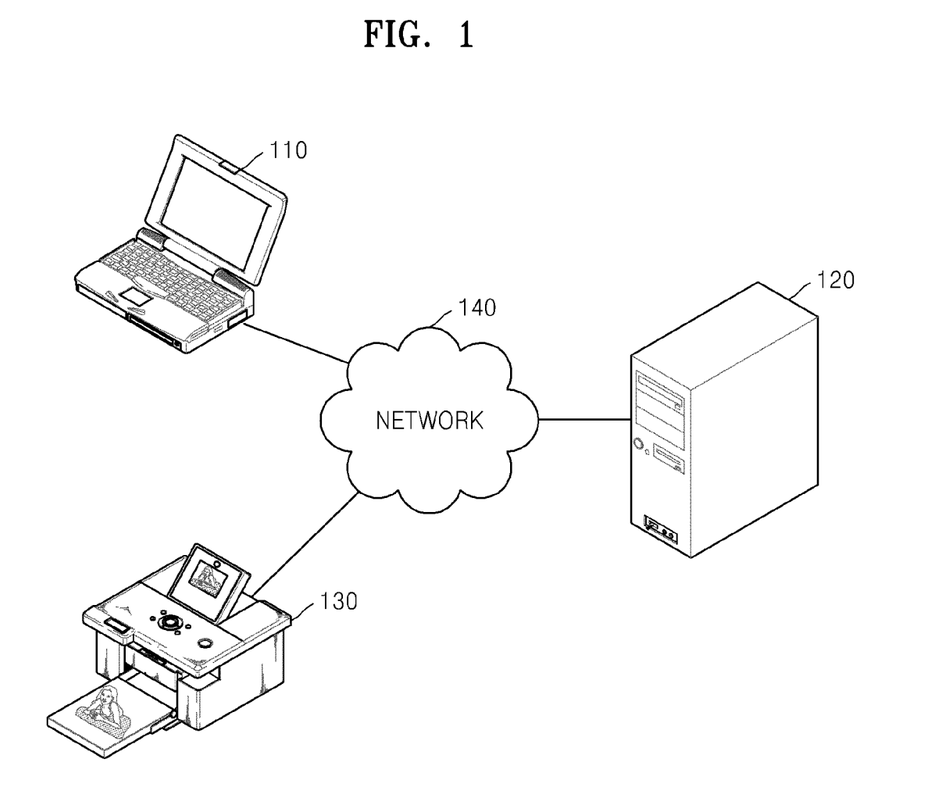
FIG. 1 illustrates a system for forming an image according to an embodiment of the present invention.

FIG. 1 illustrates a system for forming an image according to an embodiment of the present invention. Referring to FIG. 1, the system for forming an image includes a host 110, a server 120, and an apparatus for forming an image 130. These are connected to each other through a network 140.

The host 110 generates an item through an application that can generate a file having an image editing function. Such an item is a file that applies special effects to an image to convert the image and is formed of one or a plurality of image editing commands. As an example, when an application such as PHOTOSHOP is used, such item is called an action item.

Herein, action items used in PHOTOSHOP are mainly described, although it is to be understood that action items used in other applications may be used.

Figure 2A:
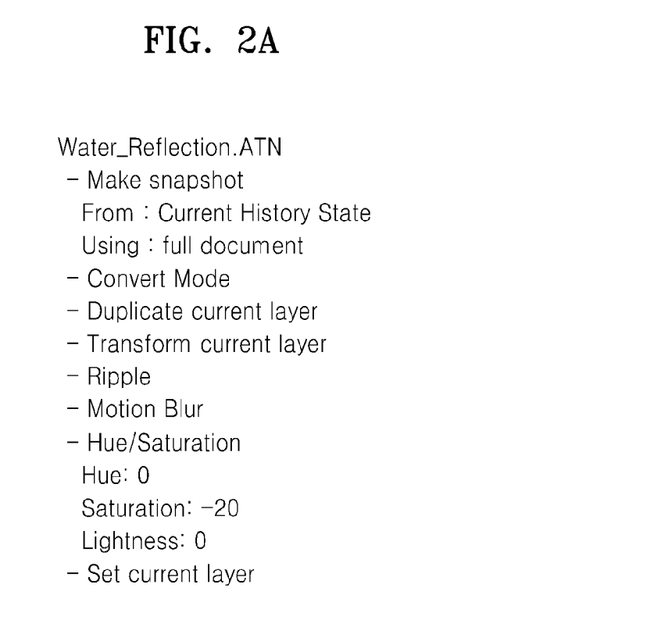
FIGS. 2A and 2B illustrate examples of a file format used in a system for forming an image according to an embodiment of the present invention
Figure 2B:
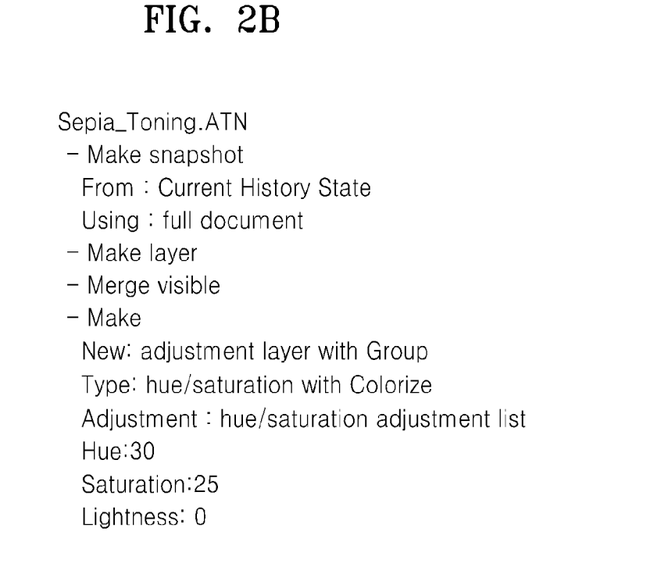

The host 110 generates an action item by using an application such as PHOTOSHOP that can generate an action item in an application. The term "action" refers to the recording and storing details of processes executed in an application that can correct and edit an image, apply the details of applied processes when needed and be automatically applied. The term "action item" refers to an action file that processes a series of images. For example, an action item may include items such as "water reflection" and "sepia toning layer," wherein "water reflection" processes an image so that the subject of the image appears to be mirrored in water, while manufacturing a shadow and the "sepia toning layer" processes an image with a soft brown monotone. For example, such action items have an file extension of .ATN and have formats such as are respectively illustrated in FIGS. 2A and 2B. Moreover, the host 110 connects to the server 120 and registers the generated action items.

The server 120 provides an environment in which User Created Content (UCC) produced by users themselves can be shared among the users. In particular, the server 120 according to the current embodiment of the present invention allows sharing of the action item from among the UCC. More specifically, the server 120 registers and stores the action items generated by the application of the host 110 and provides the registered action items to the users according to users' requests. In addition, the server 120 receives and stores comments on the registered action items or the result of the image after use from the users and provides the stored comments or result to other users.

The apparatus for forming an image 130 converts an image by using at least one action item and performs a predetermined process. The action items used here may be action items downloaded from the server 120 or action items stored in the apparatus for forming an image 130. Also, the predetermined process includes printing out the converted image, converting a scanned image to print out, converting a scanned image to store, and sending the converted image by fax. In addition, such an apparatus for forming an image 130 may be a photo printer or a multi-function printer that can print out photographs.

Figure 3:
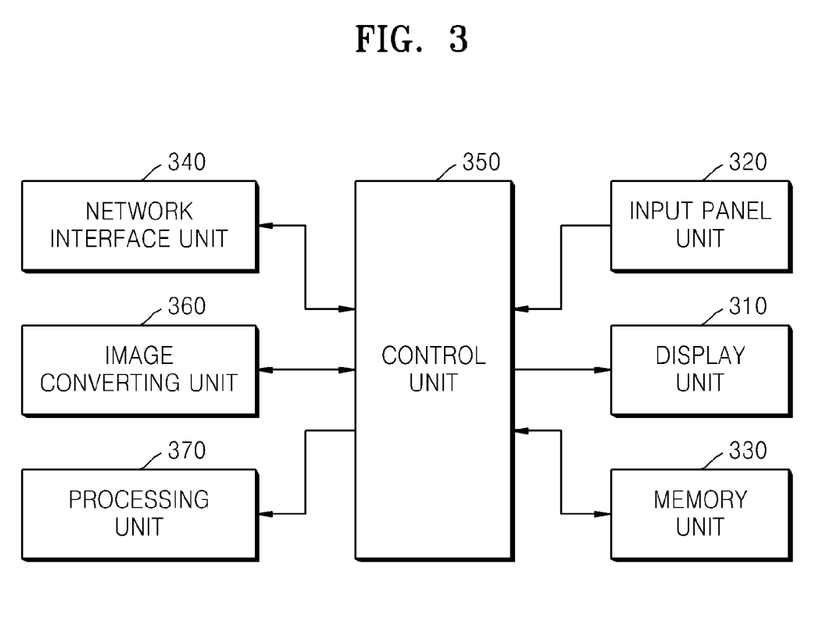
FIG. 3 is a block diagram of an apparatus for forming an image according to an embodiment of the present invention.

FIG. 3 is a block diagram of an apparatus for forming an image according to an embodiment of the present invention. Referring to FIG. 3, the apparatus for forming an image 130 includes a display unit 310, an input panel unit 320, a memory unit 330, a network interface unit 340, a control unit 350, an image converting unit 360, and a processing unit 370.

The display unit 310, which can be an LCD panel, for example, displays a menu that allows the selection of various functions supported by the apparatus for forming an image 130 to users according to control by the control unit 350. In particular, the display unit 310 displays a user interface to users according to control by the control unit 350, wherein the user interface selects a specific image as a target image to be processed from among the images stored in the memory unit 330, selects whether a function for converting an image by using an action item is used, selects whether a list of the action items stored in the memory unit 330 should be updated, and receives user commands with respect to the names of the action items to be applied to an image from among the list of the action items stored in the memory unit 330.

Figure 4:
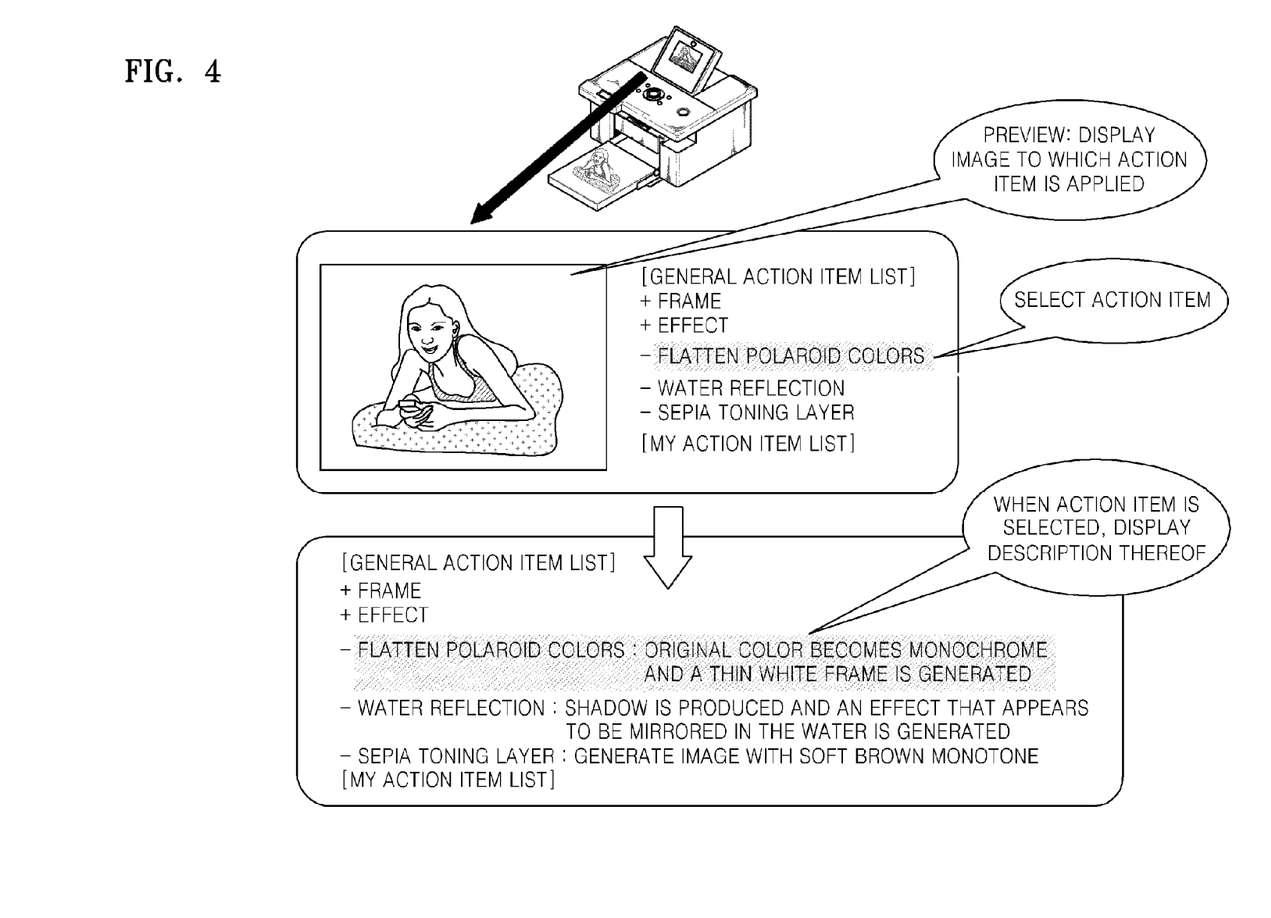
FIG. 4 illustrates an example of a user interface for receiving a user command with respect to an action item to be applied to an image from among a list of action items stored in a memory unit in a display unit of FIG. 3.

In particular, FIG. 4 illustrates an example of a user interface that receives a user command with respect to an action item to be applied to an image from among the list of action items stored in the memory unit 330 in the display unit 310 of FIG. 3.

As illustrated on the right side of FIG. 4, the display unit 310 includes the lists of the action items, which are classified into a general action item list and a my action item list. When the user selects the general action item list, the display unit 310 displays a frame folder and an effect folder and then, when the user selects the effect folder, the titles 'flatten Polaroid colors,' 'Water Reflection,' and 'Sepia Toning Layer,' which represent items stored in the effect folder, are displayed. In addition, when the user selects 'flatten Polaroid colors' as the action item to be applied to the image on the left side, the description of the item 'original color becomes monochrome and a thin white frame is generated' is displayed to the user. Then, when the action item is selected and a preview command is input, the selected action item is applied to the image, the image is converted, and the converted image is displayed, as illustrated in the left side of FIG. 4.

The input panel unit 320 receives user commands that set or select various functions supported from the apparatus for forming an image 130. The input panel unit 320 includes a touch screen and a plurality of key buttons. In particular, the input panel unit 320 according to the current embodiment of the present invention receives a command for selecting the target image to be processed from the images stored in the memory unit 330, a command for using a function of converting an image by using the action item, a command for updating the list of the action items stored in the memory unit 330, and the names of the action items to be applied to the image and transmits these command and the names of the action items to the control unit 350. Here, at least one name can be input as the names of the action items to be applied to the image.

The memory unit 330 stores various control programs required to embody the functions of the apparatus for forming an image 130. In particular, the memory unit 330 according to the current embodiment of the present invention allows the lists of the action items and the action items to be downloaded from the server 120 according to the users' commands input through the input panel unit 320 and stores a control program that interprets the downloaded action items and converts the image. In addition, the memory unit 330 stores various images, the lists of the action items downloaded from the server 120, and the action items.

The network interface unit 340 transmits and sends the lists of the action items or the action items between the apparatus for forming an image 130 and the server 120.

The control unit 350 controls the overall operations of the apparatus for forming an image 130. In particular, according to the current embodiment of the present invention, when the command to update is delivered through the input panel unit 320, the control unit 350 requests the lists of the action items to the server 120 to control for the lists of the action items to be downloaded. When the names of the action items are input through the input panel unit 320, the control unit 350 examines whether the selected action item is stored in the memory unit 330. If the selected action item is not stored in the memory unit 330, the control unit 350 provides a request to the server 120 so that the lists of the action items can be downloaded. In this case, only the lists of the action items are stored in the memory unit 330 and the action items according to the list may be stored in the server 120, instead of the memory unit 330.

The image converting unit 360 interprets the action items downloaded from the server 120 according to control by the control unit 350 or stored in the memory unit 330 and converts a selected image according to the interpreted action items. As an example, when the downloaded action item is "water reflection," the image converting unit 360 interprets the action items and converts the image by inserting a wave pattern, applying a shadow effect, and changing brightness and saturation.

In addition, the processing unit 370 performs a predetermined process with respect the image converted by the image converting unit 360 according to control by the control unit 350. The predetermined process may include printing out the converted image, converting a scanned image to print out, converting a scanned image to store, and sending the converted image to the outside by fax.

Figure 5:
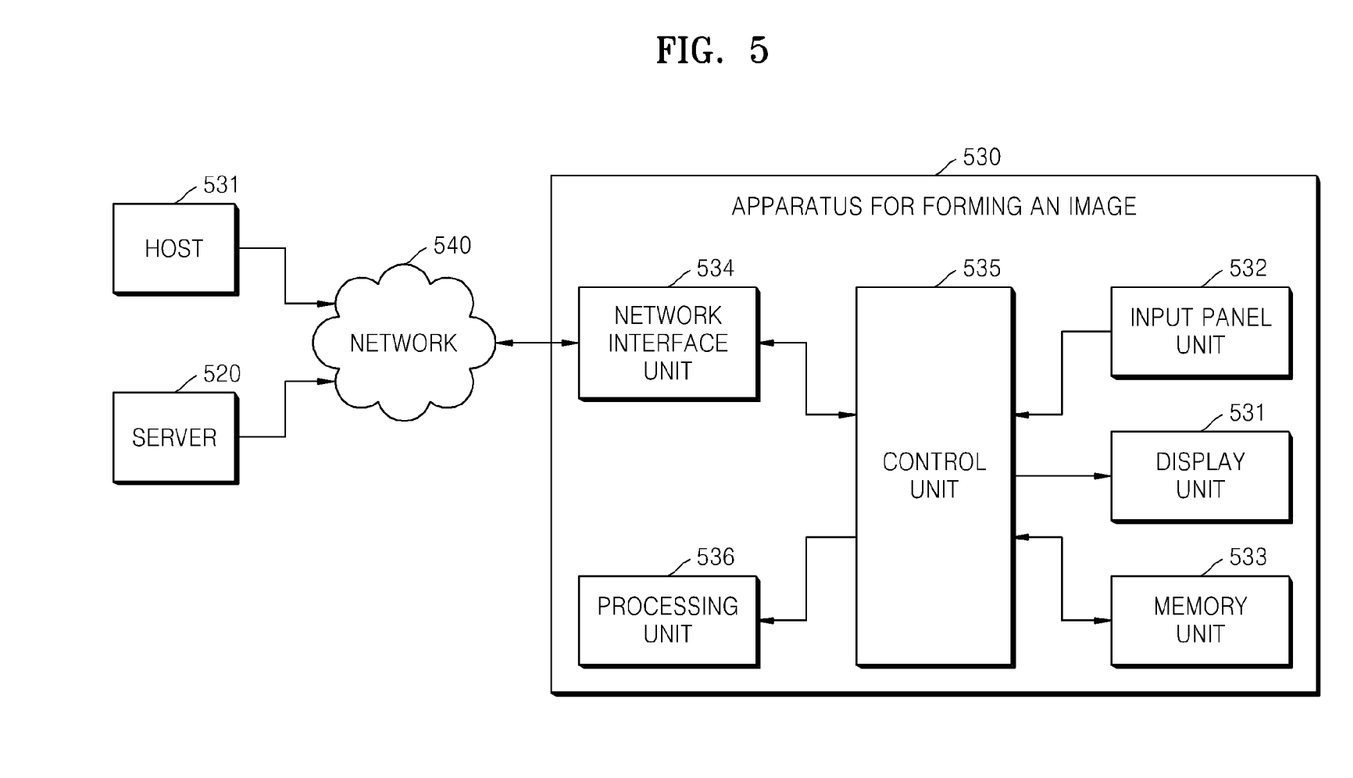
FIG. 5 is a block diagram of a system for forming an image according to another embodiment of the present invention.

FIG. 5 is a block diagram of a system to form an image according to another embodiment of the present invention. Referring to FIG. 5, the system to form an image includes a host 510, a server 520, and an apparatus to form an image 530. These are connected to each other through a network 540. In addition, the apparatus to form an image 530 includes a display unit 531, an input panel unit 532, a memory unit 533, a network interface unit 534, a control unit 535, and a processing unit 536.

Similar to the host 110 illustrated in FIG. 1, the host 510 generates an action item by using an application which can generate a file having an image editing function and registers the generated item to the server 520. Such items include an action item such as is used in PHOTOSHOP.

Similar to the server 120 of FIG. 1, the server 520 provides an environment in which User Created Content (UCC) produced by users can be shared between the users. More specifically, the server 520 provides an environment in which the action items from among the UCC can be shared. In particular, when an image and the names of the action items are transmitted from the apparatus to forming an image 530, the server 520 interprets the action items according to the transmitted names of the action items and converts the image. In addition, the server 520 provides the converted image to the apparatus to form an image 530. The apparatus to form an image 530 transmits the image and the names of the action items to be applied to the image to the server 520 and receives the converted image from the server 520.

The display unit 531 displays a user interface to the user according to control by the control unit 535, wherein the user interface selects a specific image as a target image to be processed from among the images stored in the memory unit 533 and receives user commands with respect to the names of the action items to be applied to an image from among the list of the action items stored in the memory unit 533.

The input panel unit 532 receives a command to select the target image to be processed from among the images stored in the memory unit 533 and the names of the action items to be applied to the image and transmits the command and the names of the action items to the control unit 350. Here, at least one name of the action items to be applied to the image can be received.

The memory unit 533 stores a control program that allows transmitting of the image selected through the input panel unit 532 and application of the names of the action items to the image to the server 520, displays the image received from the server 520 to the user, or controls to perform a predetermined process.

In addition, the memory unit 533 stores various images and images received from the server 520. Here, the images received from the server 520 are referred to as the images converted from the server 520 and received by the apparatus to form an image 530.

The network interface unit 534 transmits and sends the images, the names of the action items to be applied to the images, and the converted images between the apparatus for forming an image 530 and the server 520.

When the names of the action items are received through the input panel unit 532, the control unit 535 controls the received names of the action items and the selected images to be transmitted to the server 520 and controls the images received from the server 520 to be displayed through the display unit 531.

In addition, when a command for a predetermined process is input through the input panel unit 532, the control unit 535 controls to perform the predetermined process with respect to the received image.

According to control by the control unit 535, the processing unit 536 performs the predetermined process with respect to the received images. Here, the predetermined process may include printing out the converted image, converting a scanned image to print out, converting a scanned image to store, and sending the converted image to the outside by fax.

Figure 6:
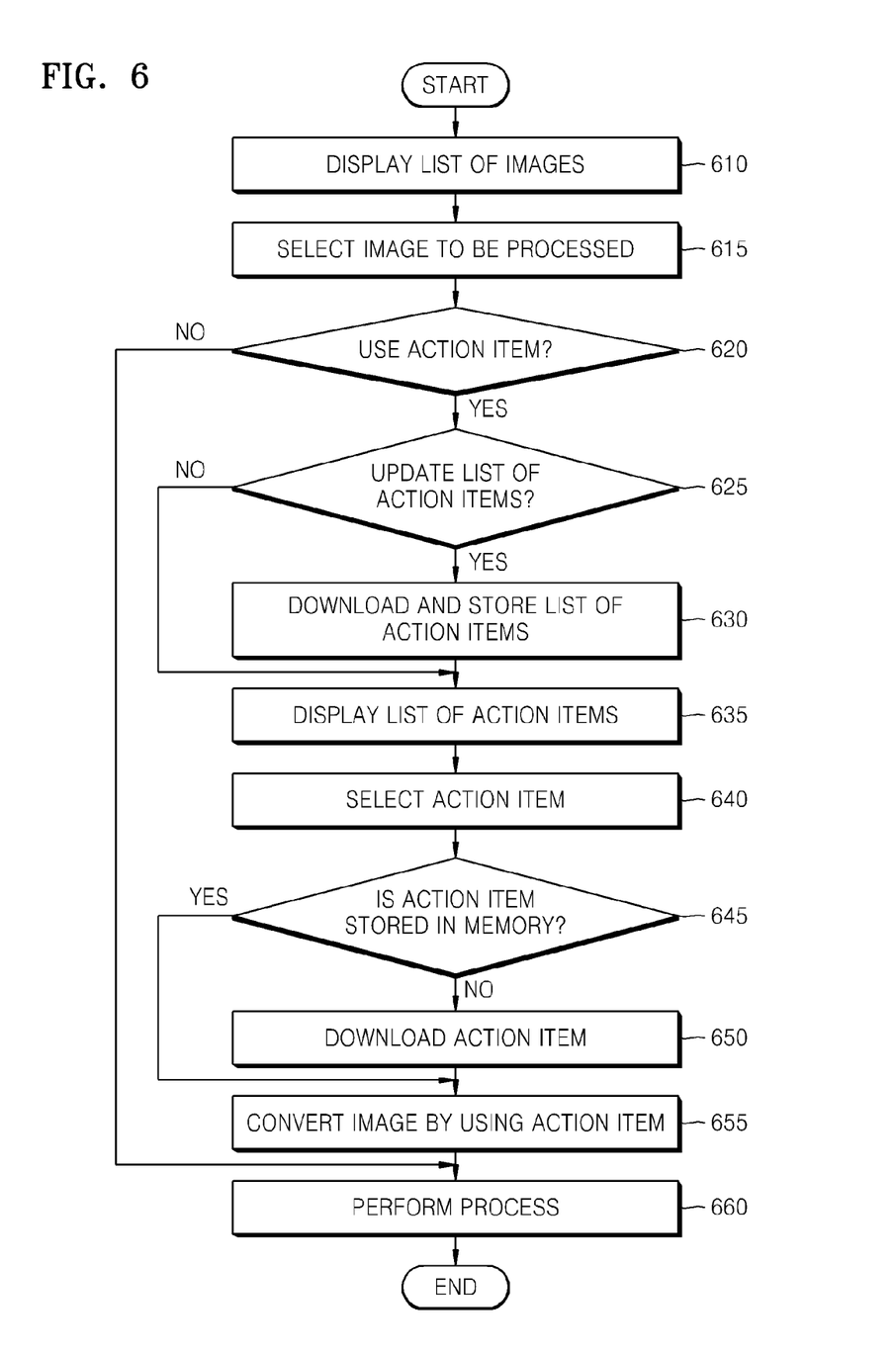
FIG. 6 is a flowchart of a method of forming an image according to an embodiment of the present invention.

FIG. 6 is a flowchart of a method of forming an image according to an embodiment of the present invention.

Referring to FIG. 6, the method of forming an image includes processes performed, in sequential order, from the apparatus for forming an image of FIG. 3. Thus, the description of the apparatus for forming an image of FIG. 3 above can be applied to the method of forming an image according to the current embodiment of the present invention, even if the description is not repeated below.

In operation 610, the apparatus for forming an image 130 reads out the lists of the images stored in an internal memory of the apparatus for forming an image 130 or external devices such as a USB memory and a digital camera connected to the apparatus for forming an image 130 and displays the lists to a LCD panel. Here, the lists of the images can be file names of the images.

In operation 615, the image to be processed is selected from among the lists of the images displayed in operation 610 and the apparatus for forming an image 130 receives the image from the user. Here, the apparatus for forming an image 130 can receive the image to be processed from the user through a touch screen or a plurality of key buttons. Here, the process may include at least one from printing out the image, storing the image, and sending the image to the outside by fax.

In operation 620, when the image to be processed is selected in operation 615, the apparatus for forming an image 130 reads out a first menu from the memory that can receive a function to convert the image by using the action items from the user and displays the first menu to the LCD. An input for using the action items is received from the user through the displayed first menu. If a Yes response is received at operation 620, a process described in operation 625, below is then performed. If a No response is received at operation 620, a process described in operation 660, below is then performed.

In operation 625, when there is an input in operation 620 to use the action items from the user, the apparatus for forming an image 130 reads out a second menu from the memory that can receive an input as to whether to update the lists of the action items stored in the memory from the user and displays the second menu to the LCD. Whether to update the lists of the action items stored in the memory is input through the displayed second menu from the user. If a Yes response is input at operation 625, a process described in operation 630, below is then performed. If a No response is input at operation 620, a process described in operation 635, below is then performed.

In operation 630, when there is an input in operation 625 to update the lists of the action items from the user, the apparatus for forming an image 130 connects to the server 120, which provides the lists of the action items, and downloads the lists of the action items stored in the server 120, thereby updating the lists of the action items stored in the memory of the apparatus for forming an image 130.

In operation 635, the apparatus for forming an image 130 displays the lists of the action items stored in the memory of the apparatus for forming an image 130 to the user through the LCD. As an example, the lists of the action items are displayed as illustrated with reference to FIG. 4.

Such lists of the action items can be classified into two categories. One category is called "my action items" and is a list of the action items specifically selected by the user that is, a list of action items that are frequently used or specifically desired by the user from among all lists of action items and are specifically selected by the user. Another category is called "general action items" and is a list of the action items that are not specifically designated by the user.

In operation 640, the action item to be applied to the image selected in operation 615 is selected by the user from among the lists of the action items displayed in operation 635, and the apparatus for forming an image 130 receives the action item.

In operation 645, the apparatus for forming an image 130 examines whether the action item selected in operation 640 is already stored in its memory. If the action item is already stored in the memory of the apparatus for forming an image 130, unnecessary downloading of the action item from the server 120 is avoided.

In operation 650, when it is determined in operation 645 that the action item is not already stored in the memory of the apparatus for forming an image 130, the apparatus for forming an image 130 connects to the server 120 and downloads the action items selected in operation 640, thereby storing the action items to its memory.

In operation 655, the apparatus for forming an image 130 converts the image by applying the action items selected in operation 640 to the image selected in operation 615. For example, when the action item selected in operation 640 is 'Water Reflection', the apparatus for forming an image 130 interprets 'Water Reflection' with respect to the image selected in operation 615 and converts the image by inserting a wave pattern, applying a shadow effect, and changing brightness and saturation. Accordingly, a shadow is produced and an effect that appears to be mirrored in water is applied to the image.

In operation 660, the apparatus for forming an image 130 performs a process with respect to the image converted in operation 655. The process may include printing out the image, storing the image, or sending the image to the outside by fax. Also, the apparatus for forming an image 130 can initially display the image converted in operation 655 in a preview form and can perform a process according to the command, only when the command for performing the process is input from the user.

Figure 7:
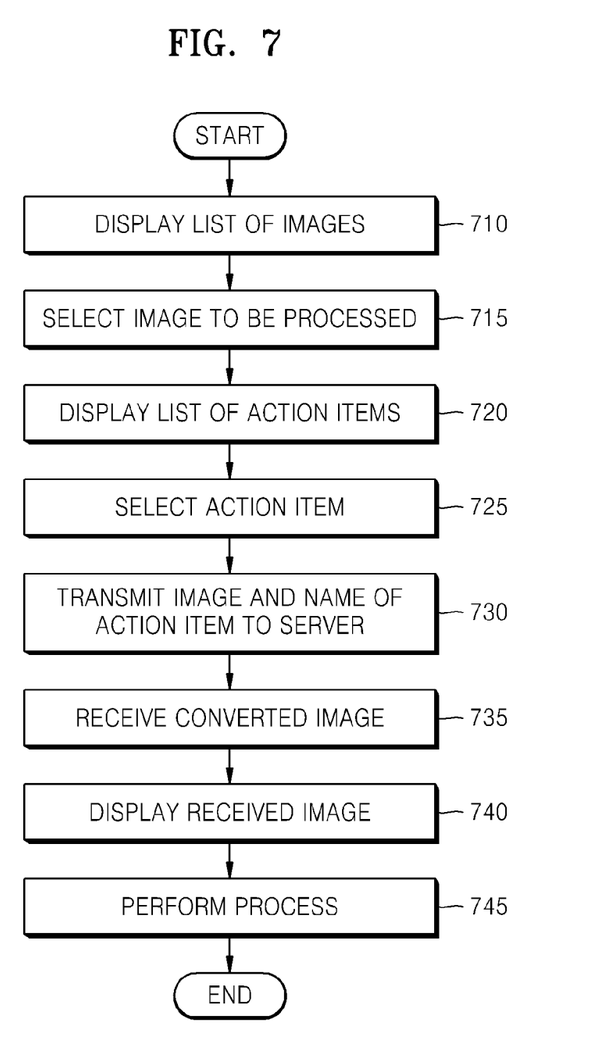
FIG. 7 is a flowchart of a method of forming an image according to another embodiment of the present invention.

FIG. 7 is a flowchart of a method of forming an image according to another embodiment of the present invention. Referring to FIG. 7, the method of forming an image includes processes performed, in sequential order, by the apparatus for forming an image of FIG. 5. Thus, the description of the apparatus for forming an image of FIG. 5 above can be applied to the method of forming an image according to the current embodiment of the present invention, even if the description is not repeated below.

In operation 710, the apparatus for forming an image 530 reads out the lists of images stored in an internal memory of the apparatus for forming an image 530 or in external devices such as a USB memory or a digital camera connected to the apparatus for forming an image 530 and displays the lists to a LCD panel. The lists of the images can be file names of the images.

In operation 715, the image to be processed is selected from among the lists of the images displayed in operation 710 and the apparatus for forming an image 530 receives the image from the user.

In operation 720, when the image to be processed is selected in operation 715, the apparatus for forming an image 530 displays the lists of the action items stored in the memory to the user through the LCD.

In operation 725, the apparatus for forming an image 530 receives the name of the action item to be applied to the image selected in operation 715 from among the lists of the action items displayed in operation 720 from the user.

In operation 730, the apparatus for forming an image 530 transmits the image selected in operation 710 and the name of the action item input in operation 725 to the server 520.

In operation 735, the apparatus for forming an image 530 receives the image converted by the action item according to the name of the action item transmitted from the server 520.

In operation 740, the apparatus for forming an image 530 displays the image received in operation 735 to the user.

In operation 745, when a command to perform a process is input from the user, the apparatus for forming an image 530 performs a process with respect to the image received in operation 735. Here, the process may include at least one from printing out the image, storing the image, and sending the image to the outside by fax.

As described above, the apparatus for forming an image and method of forming an image according to aspects of the present invention displays the list of at least one item to be used in editing of the image, receives at least one item from among the displayed list of the items, and converts the image to be processed by using at least one item selected so that the items having an image editing function can be shared between users and thus an image desired by a user can be easily and conveniently obtained.

Aspects of the invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of forming and printing an image using action items, the method comprising:

displaying, in an apparatus for forming and printing the image, a list of one or more action items to be used in editing the image at the apparatus for forming and printing the image;

receiving a selection of at least one action item from the displayed list in the apparatus for forming and printing the image;

determining whether the selected action item is stored in a memory of the apparatus;

downloading the selected action item via a network if determined that the selected action item is not stored in the memory;

converting the image using a process designated by the at least one selected action item in the apparatus for forming and printing the image and printing the converted image in the apparatus for forming and printing the image, wherein each of the one or more action items is a file that applies a predetermined effect on the image and is downloaded via the network.

2. The method of claim 1, wherein the action item is a file having an image action function and wherein the action item is registered to a server or stored in the apparatus for forming and printing the image.

3. The method of claim 1, wherein the action item is a file that includes at least one image action command.

4. The method of claim 1, wherein the displaying of the list of one or more action items includes connecting to a server, inputting a command to update the list of one or more action items, and downloading an updated list of action items registered to the connected server.

5. The method of claim 1, wherein the processing of the converted image comprises:
previewing the converted image in the apparatus for forming and printing the image; and
inputting a command to perform the processing in the apparatus for forming and printing the image.

6. The method of claim 5, wherein the processing of the converted image includes carrying out at least one process selected from printing out, copying, scanning, and faxing.

7. The method of claim 1, further comprising storing a list of at least one action item selected by a user in a separate category.

8. A non-transitory computer readable recording medium having embodied thereon a computer program for executing the method of claim 1.

9. The method according to claim 1, wherein the list of action items includes converts inserting a wave pattern, applying a shadow effect, changing brightness, and saturation.

10. A method of forming and printing an image by using action items, the method comprising:
displaying, in an apparatus for forming and printing the image, a list of one or more action items to be used in editing the image at the apparatus for forming and printing the image;
receiving a selection of at least one action item from the displayed list in the apparatus for forming and printing the images;
transmitting an image to be processed and a name of the selected action item from the apparatus for forming and printing the image to a server;
receiving, in the apparatus for forming and printing the image, the image converted by a process designated by the selected action item from the server; and
performing a predetermined process with respect to the received image in the apparatus for forming and printing the image,
wherein each of the one or more action items is a file that applies a predetermined effect on the image and the list of the action items is downloaded via a network.

11. An apparatus for forming and printing an image by using action items, the apparatus comprising:
a display unit that displays a list of one or more action items to be used in editing the image;
an input panel unit that receives a selection of at least one action item from the displayed list of action items;
a control unit that determines whether the selected action item is stored in a memory of the apparatus;
a network interface unit that downloads the selected action item if determined that the selected action item is not stored in the memory;
an image converting unit that converts the image using a process designated by the at least one selected action item; and
the control unit that controls the display unit, the input panel unit, the image converting unit and the network interface unit,
wherein each of the one or more action items is a file that applies a predetermined effect on the image and is downloaded via a network.

12. The apparatus of claim 11, wherein the action item is a file having an image editing function and wherein the action item is registered to a server or previously stored in the apparatus for forming and printing an image.

13. The apparatus of claim 11, wherein the action item is a file that includes at least one image editing command.

14. The apparatus of claim 11, wherein the control unit connects to a server and downloads an updated list of action items registered to the connected server when a command for updating the list of one or more action items is input.

15. The apparatus of claim 11, further comprising an image converting unit that converts the image by using the at least one selected action item, wherein the display unit displays the converted image to be previewed and the control unit performs a process with respect to the previewed image when a command is input.

16. The apparatus of claim 11, wherein the control unit controls a list of at least one item selected by a user to be stored in a separate category.

17. An apparatus for forming and printing an image by using action items, the apparatus comprising:
a display unit that displays a list of one or more action items to be used in editing the image;
an input panel unit that receives a selection of at least one action item from the displayed list of action items;
a network interface unit that downloads the list of the action item from a server and, transmits an image to be processed and a name of the selected action item to the server and receives the image converted by a process designated by the selected action items from the server; and
a control unit that controls to perform a predetermined process with respect to the received image
wherein the action item is a file that applies a predetermined effect on the image.

18. A system for forming and printing an image comprising:
a host that generates at least one action item to be used in editing of the image and transmits the generated action item to a server;
a server which registers the transmitted action item; and
an apparatus for forming and printing an image,
wherein the apparatus comprises:
a display unit that displays a list of one or more action items;
an input panel unit that receives a selection of at least one action item from the displayed list of action items;
a control unit that determines whether the selected action item is stored in a memory of the apparatus;
a network interface unit that downloads the selected action item if determined that the selected action item is not stored in the memory;
an image converting unit that converts the image using a process designated by the at least one selected action item; and
the control unit that controls the display unit, the input panel unit, the image converting unit and the network interface unit, and
wherein the action item is a file that applies a predetermined effect on the image.

19. The system of claim 18, wherein the server receives and stores the converted image.

20. The system of claim 19, wherein the server receives and stores user comments regarding the converted image.

21. The system of claim 18, wherein the server receives and stores user comments regarding the action item.

* * * * *

UNITED STATES PATENT AND TRADEMARK OFFICE
CERTIFICATE OF CORRECTION

PATENT NO.         : 8,856,208 B2                                          Page 1 of 1
APPLICATION NO.    : 12/173953
DATED              : October 7, 2014
INVENTOR(S)        : Jae-in Lee It is certified that error appears in the above-identified patent and that said Letters Patent is hereby corrected as shown below:

On the Title Page

Column 2, Item [56] (Other Publications), line 1, delete "Feburary" and insert -- February --, therefore.

Signed and Sealed this
Nineteenth Day of May, 2015

Michelle K. Lee
*Director of the United States Patent and Trademark Office*